United States Patent
Huang et al.

(10) Patent No.: US 12,301,733 B2
(45) Date of Patent: May 13, 2025

(54) VEHICLE DIGITAL CERTIFICATE MANAGEMENT METHOD AND DEVICE

(71) Applicant: GUANGZHOU AUTOMOBILE GROUP CO., LTD., Guangdong (CN)

(72) Inventors: Qingquan Huang, Guangdong (CN); Jinchi Zhang, Guangdong (CN); Xiaosheng Shi, Guangdong (CN); Zicheng Zhang, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 150 days.

(21) Appl. No.: 17/991,505

(22) Filed: Nov. 21, 2022

(65) Prior Publication Data
US 2023/0088018 A1   Mar. 23, 2023

Related U.S. Application Data

(63) Continuation-in-part of application No. PCT/CN2021/097617, filed on Jun. 1, 2021.

(30) Foreign Application Priority Data

Jun. 12, 2020  (CN) .......................... 202010535114.1

(51) Int. Cl.
*H04L 9/32*   (2006.01)
*G06F 15/16*  (2006.01)
(Continued)

(52) U.S. Cl.
CPC .......... *H04L 9/3268* (2013.01); *H04L 9/0891* (2013.01); *H04L 63/0823* (2013.01); *H04L 2209/84* (2013.01)

(58) Field of Classification Search
CPC . H04L 9/3268; H04L 9/0891; H04L 63/0823; H04L 2209/84; H04L 9/3263;
(Continued)

(56) References Cited

U.S. PATENT DOCUMENTS

2004/0255113 A1* 12/2004 Ogura ................... H04L 67/025
                                                      726/6
2005/0160259 A1*  7/2005 Ogura ................. H04L 63/0823
                                                     713/156
(Continued)

FOREIGN PATENT DOCUMENTS

CN   102572552 A   7/2012
CN   106411840 A   2/2017
(Continued)

*Primary Examiner* — Zi Ye
*Assistant Examiner* — Berhanu Shitayewoldetadik
(74) *Attorney, Agent, or Firm* — Li & Cai Intellectual Property (USA) Office

(57) ABSTRACT

A vehicle digital certificate management method and a device thereof. The vehicle digital certificate management method comprises: after a vehicle-mounted network connection terminal is powered on, performing an initialization on a universal digital certificate, and if the universal digital certificate is abnormal, generating mandatory certificate maintenance request information; calculating the difference between a real time when the vehicle-mounted network connection terminal is powered on and the last maintenance time of the universal digital certificate, comparing the difference with a preset certificate maintenance period, and if the difference is greater than the preset maintenance period, generating period maintenance request information; and performing certificate maintenance according to the mandatory certificate maintenance request information or the periodic maintenance request information when a communication state of the vehicle network connection terminal satisfies a certificate maintenance condition.

12 Claims, 4 Drawing Sheets

(51) Int. Cl.
*H04L 9/08* (2006.01)
*H04L 9/40* (2022.01)
*H04L 15/16* (2006.01)

(58) Field of Classification Search
CPC ........ H04L 67/12; H04W 4/40; H04W 12/06; H04W 12/069
USPC .......................................................... 713/156
See application file for complete search history.

(56) References Cited

U.S. PATENT DOCUMENTS

| | | | |
|---|---|---|---|
| 2013/0086377 A1* | 4/2013 | Cilfone | H04L 9/085 |
| | | | 713/156 |
| 2014/0325208 A1* | 10/2014 | Resch | G06F 11/00 |
| | | | 713/156 |
| 2015/0256534 A1* | 9/2015 | Goudy | H04W 12/033 |
| | | | 713/156 |
| 2017/0034867 A1 | 2/2017 | Oshida | |
| 2018/0337957 A1 | 11/2018 | Chen | |
| 2019/0137199 A1* | 5/2019 | Tashiro | F25B 49/02 |
| 2020/0177398 A1* | 6/2020 | Takemori | H04L 63/0823 |

FOREIGN PATENT DOCUMENTS

| | | | | |
|---|---|---|---|---|
| CN | 107026738 A | | 8/2017 | |
| CN | 107786344 A | * | 3/2018 | ......... H04L 63/0823 |
| CN | 108270610 A | | 7/2018 | |
| CN | 110120951 A | * | 8/2019 | |
| CN | 110225013 A | * | 9/2019 | ............. H04L 63/12 |
| CN | 110289955 A | * | 9/2019 | ........... H04L 9/0819 |
| CN | 110572266 A | | 12/2019 | |
| CN | 110958607 A | | 4/2020 | |

* cited by examiner

VEHICLE DIGITAL CERTIFICATE MANAGEMENT METHOD AND DEVICE

CROSS-REFERENCE TO RELATED APPLICATIONS

This application is a continuation of PCT International Application No. PCT/CN2021/097617, filed on Jun. 1, 2021, now abandoned, which claims priority to China Application No. 202010535114.1 filed on Jun. 12, 2020.

TECHNICAL FIELD

The present application relates to the technical field of Internet of Vehicles, and more particularly, to a vehicle digital certificate management method and a device.

BACKGROUND

There are mature methodologies and application cases in many non-automotive domains for establishing a cybersecurity environment with a core of cryptography and a basis of Public Key Infrastructure (PKI). With the developments of intelligentizing and networking, a security environment of vehicles is becoming more and more complex, and there are more and more security threats, and thus a PKI-based vehicle information security environment is also gradually improving.

Combined with a unique application and maintenance environment of the vehicle, the PKI-based information security environment also needs to be constructed by adapting to practical application scenarios, and a vehicle digital certificate is maintained by relying on the hardware and software solutions of a vehicle mobile communication terminal.

In a traditional vehicle digital certificate management method, each time the vehicle is firstly connected to a Certificate Management System (CMS) after a vehicle-mounted network terminal is powered on, and after connected, certificate validity is verified until the verification is completed. If the certificate is invalid, a Certificate Authority (CA) needs to produce a certificate and then send it to the vehicle-mounted network terminal through the CMS. The vehicle is connected to a Telematics Service Provider (TSP) after the certificate maintenance is completed. Through the certificate is verified before networking, safety and validity of the certificate in a vehicle whole life cycle are ensured. However, this method has the following defects. A certificate query, a certificate verification and a certificate preparation are required before each connection to the TSP, which involves too many long links. It fails to perform the certificate maintenance without the user's perception, and may affect the vehicle's connection to the TSP, affecting a normal function. It fails to enforce a maintenance and an update for the certificate. It fails to flexibly configure the certificate update query cycle.

SUMMARY

There are provided an electric power steering control method, an electric power steering system and a storage medium according to embodiments of the present disclosure. The technical solution is as below:

According to a first aspect of embodiments of the present disclosure, there is provided a vehicle digital certificate management method, comprising:

step S1: performing an initialization on a universal digital certificate after a vehicle-mounted network connection terminal is powered on, obtaining a validity of the universal digital certificate, and generating mandatory certificate maintenance request information if the universal digital certificate is abnormal;

step S2: obtaining a real time when the vehicle-mounted network connection terminal is powered on, the mandatory certificate maintenance request information and a preset certificate maintenance period;

step S3: calculating a difference between the real time when the vehicle-mounted network connection terminal is powered on and a last maintenance time of the universal digital certificate, comparing the difference with the preset certificate maintenance period, and generating period maintenance request information if the difference exceeds the preset maintenance period; and step S4: performing a certificate maintenance according to the mandatory certificate maintenance request information or the period maintenance request information, when a communication state of the vehicle-mounted network connection terminal satisfies a certificate maintenance condition.

According to a second aspect of embodiments of the present disclosure, there is provided a vehicle digital certificate management device, comprising:

a memory; and a processor;

wherein the processor is configured to execute computer instructions stored in the memory, to implement following steps of the vehicle digital certificate management method:

perform an initialization on a universal digital certificate after an in-vehicle network connection terminal is powered on, obtain a validity of a universal digital certificate, and generate mandatory certificate maintenance request information if the universal digital certificate is abnormal;

obtain a real time when the in-vehicle network connection terminal is powered on, the mandatory certificate maintenance request information and a preset certificate maintenance period;

calculate a difference between the real time when the in-vehicle network connection terminal is powered on and a last maintenance time of the universal digital certificate, and compare the difference with the preset certificate maintenance period, and generate period maintenance request information if the difference exceeds the preset maintenance period; and perform a certificate maintenance according to the mandatory certificate maintenance request information or the period maintenance request information, when a communication state of the in-vehicle network connection terminal satisfies a certificate maintenance condition.

BRIEF DESCRIPTION OF THE DRAWINGS

In order to explain the embodiments of the present invention or the technical solutions in the prior art more clearly, the accompanying drawings that need to be used in the description of the embodiments or the prior art will be briefly introduced as followed. Obviously, the accompanying drawings in the following description are only some embodiments of the present invention. For those of ordinary skill in the art, other drawings can also be obtained according to these drawings without creative efforts.

DETAILED DESCRIPTION

The following descriptions of various embodiments by referring to the accompanying drawings illustrate specific embodiments in which the invention may be practiced.

Figure 1:
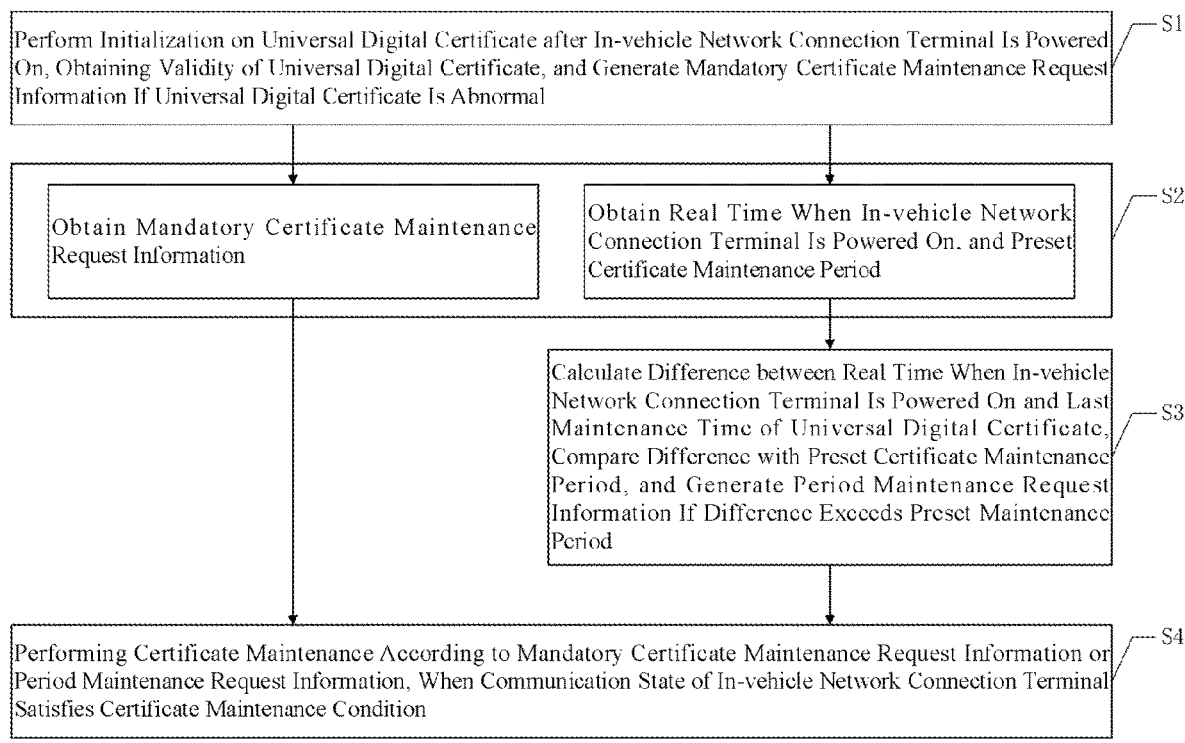
FIG. 1 is a flowchart of a vehicle digital certificate management method according to an embodiment of the present invention.

Referring to FIG. 1, the first embodiment of the present invention provides a vehicle digital certificate management method, including the following steps.

Step S1: after a vehicle-mounted network connection terminal is powered on, an initialization is performed on a universal digital certificate, a validity of the universal digital certificate is obtained. If the universal digital certificate is abnormal, mandatory certificate maintenance request information is generated.

Step S2: a real time when the vehicle-mounted network connection terminal is powered on, the mandatory certificate maintenance request information and a preset certificate maintenance period are obtained.

Step S3: a difference between the real time when the vehicle-mounted network connection terminal is powered on and a last maintenance time of the universal digital certificate is calculated, and the difference is compared with the preset certificate maintenance period. If the difference exceeds the preset maintenance period, period maintenance request information is generated.

Step S4: a certificate maintenance is performed according to the mandatory certificate maintenance request information or the period maintenance request information, when a communication state of the vehicle-mounted network connection terminal satisfies a certificate maintenance condition.

Figure 2:
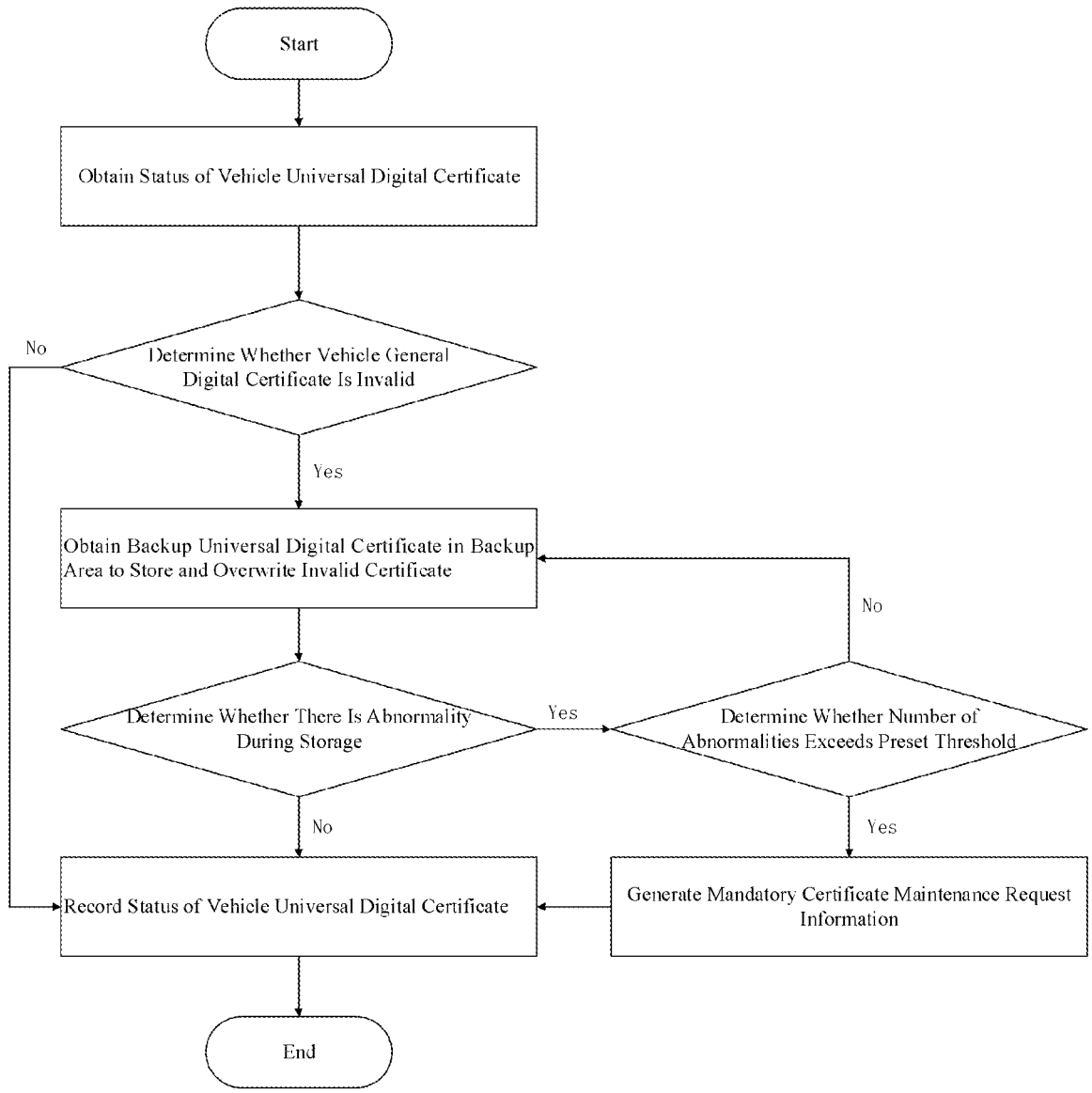
FIG. 2 is a specific flowchart of an initialization step according to a first embodiment of the present invention.

Specifically, referring to FIG. 2, in this embodiment, the initialization in the step S1 is mainly for the universal digital certificate of the vehicle (a public key certificate of a Content Management System (CMS)), and the validity is inquired through a storage path of the universal digital certificate. The validity is configured to determine whether the universal digital certificate stored where the universal digital certificate is located is damaged. The storage path of the universal digital certificate is a path configured to obtain and store the universal digital certificate, in which all related store operations and read operations are performed. If the universal digital certificate is invalid, a backup universal digital certificate in a backup area is obtained and stored to overwrite the invalid certificate. If an abnormality occurs during the storage process (for example, the storage area is damaged or the storage too busy to store normally owing to a multi-task storage scheduling), then the backup universal digital certificate in the backup area is repeatedly obtained and stored until the number of abnormality times in repeated storage exceeds a preset threshold (e.g., 5 times). If the number of abnormality times in repeated storage exceeds the preset threshold, the mandatory certificate maintenance request information is generated, which will be configured to trigger a certificate maintenance process, and a status of the certificate storage is record as failure, and the initialization process is ended. If the storage too busy to store normally owing to the multi-task storage scheduling, in the process of repeated operation and storage, the normal storage is performed after the scheduling is ended, thereby avoiding that the initialization process ends prematurely and affects the normal storage. If no abnormality occurs during the storage process, a status of the certificate storage is recorded as success, and the initialization process is ended.

It should be noted that, the mandatory certificate maintenance request information can directly trigger the certificate maintenance in the special case the general digital certificates are abnormal (see the details below), and a time span of a security threat caused by the certificate abnormality may be shortened. In addition, different from the prior art that the CMS needs to be connected firstly after the vehicle-mounted network connection terminal is powered on, and the validity of the certificate is verified until the verification is completed, it is not required to connect to the CMS in the initialization process of this embodiment. The backup universal digital certificate in the backup area is obtained and stored to overwrite the invalid certificate. If there is an abnormality in storage, the mandatory certificate maintenance request information is generated, which is configured to directly trigger the certificate maintenance, thereby ensuring the validity of the vehicle certificate in the usage whole life cycle without the user's perception.

Step S2 is a message notification mechanism provided in the embodiment of the present invention. The mandatory certificate maintenance request information is identified by a distributed digital identity identifier, that is, Decentralized Identity (DID). The mandatory certificate maintenance request information may be obtained by querying the DID. Further, a flag bit Flag_P of the mandatory certificate maintenance request information is set to 1, which is configured to be obtained in subsequent step S4 and trigger the certificate maintenance process. The real time when the vehicle-mounted network connection terminal is powered on is configured to calculate the time span in step S3, and the preset certificate maintenance period is generally 1 to 254 days. In some embodiments, the preset certificate maintenance period is 15 days.

Figure 3:
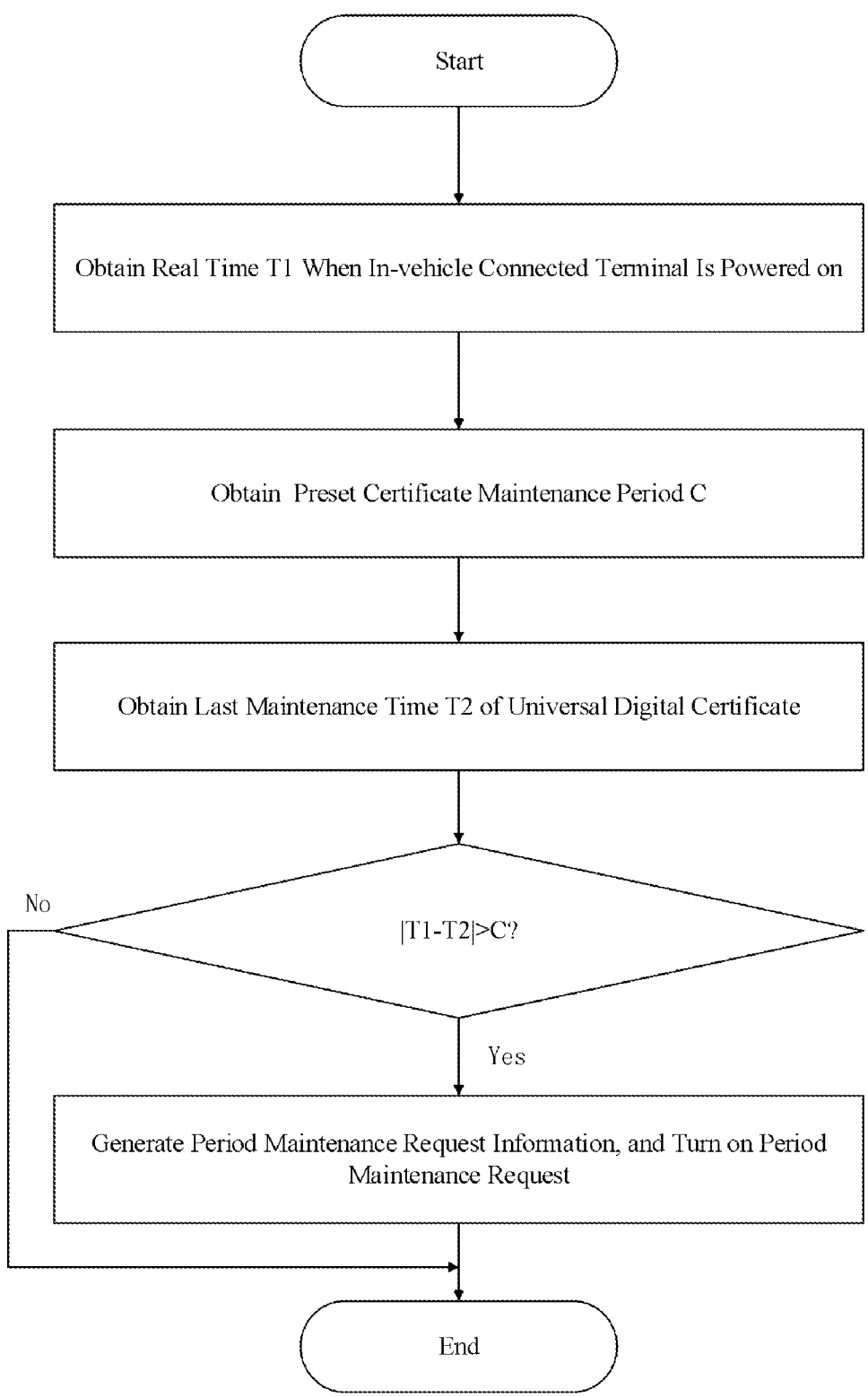
FIG. 3 is a specific flowchart of a time management according to the first embodiment of the present invention.

Referring to FIG. 3 again, step S3 is a time management mechanism set up in the embodiment of the present invention. After the vehicle-mounted network connection terminal is powered on, a time management operation is performed to calculate a difference (|T1−T2|) between the time T1 when the vehicle-mounted network connection terminal is powered on and the last maintenance time T2 of the universal digital certificate, and the difference is compared with a preset certificate maintenance period C. If the difference exceeds the preset certificate maintenance period C, it is indicated that a certificate maintenance interval is too long, which may affect the validity of the certificate, so that the periodic maintenance request information is generated, and a flag bit Flag_T of the periodic maintenance request information is set to 1.

Figure 4:
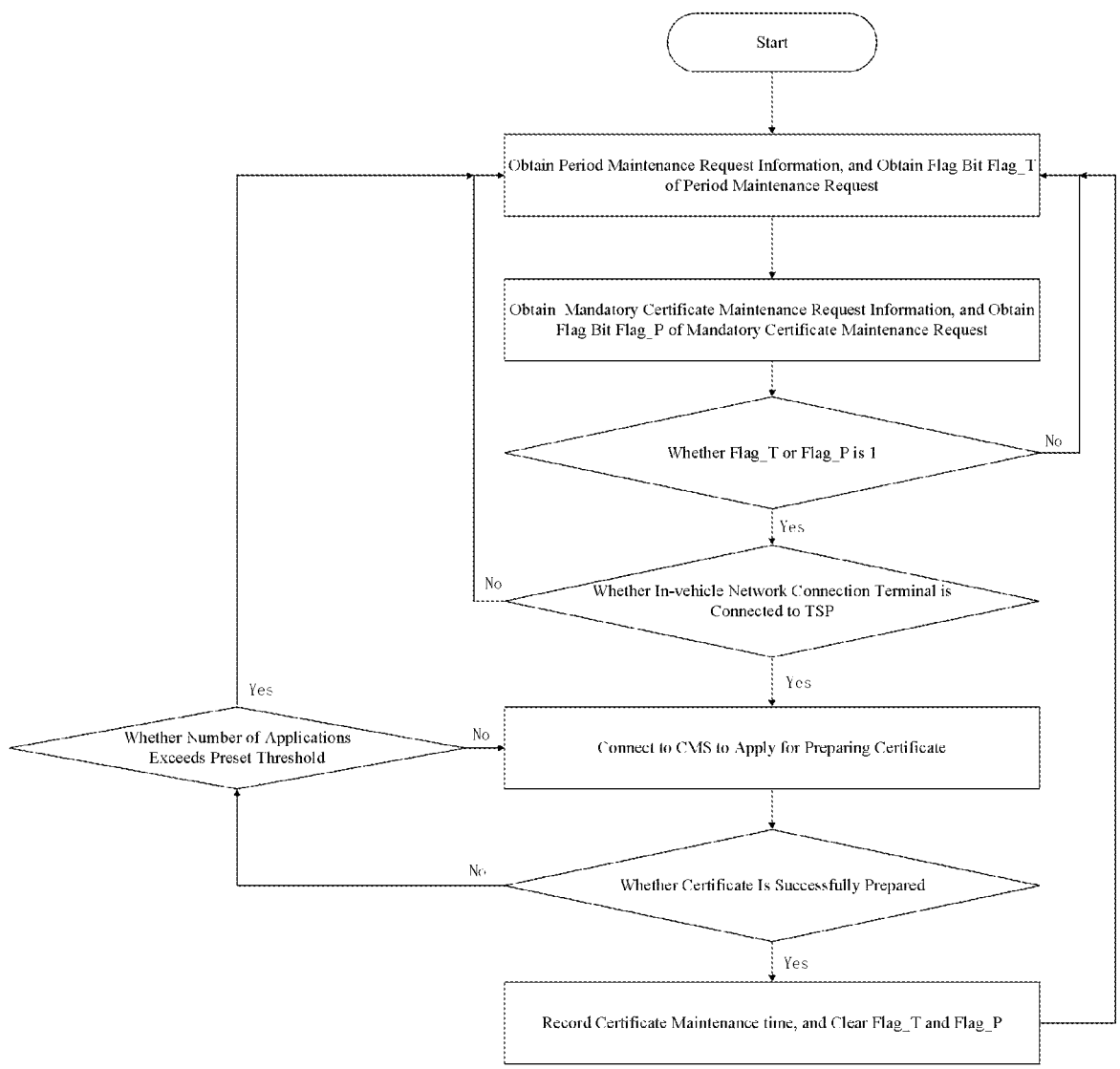
FIG. 4 is a specific flowchart of a certificate management according to the first embodiment of the present invention.

As shown in FIG. 4, step S4 is a certificate maintenance mechanism set by the embodiment of the present invention. The mandatory certificate maintenance request information or the periodic maintenance request information is obtained, and the flag bit Flag_P of the mandatory certificate maintenance request information or the flag bit of the periodic maintenance request Flag_T are obtained. If the flag bit Flag_P of the mandatory certificate maintenance request information is set to 1, or the flag bit Flag_T of the periodic maintenance request is set to 1, it is indicated that the current universal digital certificate needs to be maintained. Specifically, the flag bit Flag_P of the mandatory certificate maintenance request information is set to 1, that is, when the universal digital certificate is invalid in step S1, the operation of obtaining and storing the universal digital certificate in the backup area to overwrite the invalid certificate is abnormal. As a result, the invalid certificate cannot be overwritten with the backup certificate, so it is necessary to trigger the certificate maintenance process to apply for preparing a new universal digital certificate. The flag bit Flag_T of the periodic maintenance request is set to 1, that is, the difference ($|T1-T2|$) between the time T1 when the vehicle-mounted network connection terminal is powered on with the last maintenance time T2 of the universal digital certificate is compared with the preset certificate maintenance period C in step S3, and if the difference exceeds the preset certificate maintenance period C, it is indicated that the certificate maintenance interval is too long, so that the certificate maintenance process needs to be triggered to apply for preparing the new universal digital certificate. By obtaining the flag bit Flag_P of the mandatory certificate maintenance request information or the flag bit Flag_T of the periodic maintenance request information, the certificate maintenance process can be triggered when any flag bit is set to 1.

In this circumstance, a communication status of the vehicle-mounted network connection terminal is further determined. If the TSP is connected, the CMS is further connected to apply for preparing the universal digital certificate. If the certificate is successfully prepared, a current certificate maintenance time is recorded, which is regarded as the "last maintenance time of the universal digital certificate" as described in step S3 in the subsequent implementation of the vehicle digital certificate management method according to the embodiment of the present invention. Besides, the flag bit Flag_P of the mandatory certificate maintenance request information or the flag bit Flag_T of the periodic maintenance request information is cleared. After returning to the initial step in step S4, the subsequent new mandatory certificate maintenance request information or the periodic maintenance request information is re-obtained. If the certificate is unsuccessfully prepared, whether the number of applications exceeds a preset threshold (e.g., 5 times) is determined. If not, the CMS is connected again to apply for preparing the universal digital certificate. If yes, the initial step in step S4 is returned, the mandatory certificate maintenance request information or the periodic maintenance request information is re-obtained, and the subsequent steps are performed again, which is equivalent to perform step S4 again. If the certificate is unsuccessfully prepared due to a network communication failure, or the CMS is currently busy, then in a re-execution process, the certificate is prepared normally until the communication failure is repaired or disappears, or the CMS resumes idled, thereby avoiding a premature termination of the certification process.

It should be noted that this embodiment is further provided with a log management mechanism, which runs in steps S1-S4 in real time, and stores each operation in a safety invisible area in the vehicle-mounted network connection terminal. The log management is a security audit carrier of certificate maintenance in this embodiment, which regularly uploads logs to the cloud, and is compared with certificate maintenance logs in a cloud CMS, to determine whether there is an illegal certificate preparation process and discover security threats in time.

Corresponding to the vehicle digital certificate management method provided by the first embodiment of the present invention, the second embodiment of the present invention further provides a vehicle digital certificate management device, including:

an initialization module configured to perform an initialization on a universal digital certificate after a vehicle-mounted network connection terminal is powered on, obtain a validity of the universal digital certificate, and generate mandatory certificate maintenance request information if the universal digital certificate is abnormal;

a message notification module configured to obtain a real time when the vehicle-mounted network connection terminal is powered on, the mandatory certificate maintenance request information and a preset certificate maintenance period;

a time management module configured to calculate a difference between the real time when the vehicle-mounted network connection terminal is powered on and a last maintenance time of the universal digital certificate, and compare the difference with the preset certificate maintenance period, and generate period maintenance request information if the difference exceeds the preset maintenance period; and a certificate management module configured to perform a certificate maintenance according to the mandatory certificate maintenance request information or the period maintenance request information, when a communication state of the vehicle-mounted network connection terminal satisfies a certificate maintenance condition.

The initialization module is specifically configured to obtain a status of a universal digital certificate after the vehicle-mounted network connection terminal is powered on, and determine whether the universal digital certificate is damaged, obtain a backup universal digital certificate in a backup area to store and overwrite an invalid universal digital certificate, if the universal digital certificate is damaged, repeatedly obtain the backup universal digital certificate in the backup area to store until the number of abnormalities in repeated storage exceeds a preset threshold, generate the mandatory certificate maintenance request information, and record a status of certificate storage as failure, if an abnormality occurs during a storage process, and record the status of certificate storage as success, if no abnormality occurs during the storage process.

The mandatory certificate maintenance request information is identified by a distributed digital identifier DID, wherein a flag bit of the mandatory certificate maintenance request information is set to be 1 while generating the mandatory certificate maintenance request information, and a flag bit of the periodic maintenance request information is set to be 1 while generating the periodic maintenance request information.

The certificate management module is specifically configured to obtain the mandatory certificate maintenance request information or the periodic maintenance request information, and obtain the flag bit of the mandatory certificate maintenance request information or the flag bit of the periodic maintenance request information, trigger the certificate maintenance, if the flag bit of the mandatory certificate maintenance request information is set to 1, or the flag bit of the periodic maintenance request is set to 1, and further determine the communication status of the vehicle-mounted network connection terminal, if the vehicle-mounted network connection terminal is connected to a TSP, and connect the vehicle-mounted network connection terminal to a CMS to apply for a universal digital certificate.

If the certificate is successfully prepared, a certificate maintenance time is recorded, and the flag bit of the mandatory certificate maintenance request information or the flag bit of the periodic maintenance request information is cleared. If the certificate is unsuccessful prepared, whether the number of applications exceeds the preset threshold is firstly determined. If not, the vehicle-mounted network connection terminal connected to the CMS again to apply for a universal digital certificate. If yes, the mandatory certificate maintenance request information or the periodic maintenance request information is re-obtained, and subsequent steps are proceeded.

The vehicle digital certificate management device further include a log management module configured to store each operation of the initialization module, the message notification module, the time management module and the certificate management module in an safety invisible area of the vehicle-mounted network connection terminal.

A working principle and a process of the vehicle certificate management device of this embodiment may refer to the description of the above-mentioned first embodiment of the present invention, which will not be repeated herein.

A third embodiment of the present invention further provides a vehicle digital certificate management device, including a memory and a processor. The processor is configured to execute computer instructions stored in the memory, to implement steps of the above-mentioned vehicle digital certificate management method in the first embodiment.

It can be seen from the above-mentioned description that, compared to the prior art, the present invention has the following beneficial effects. The validity of the vehicle certificate over the whole life cycle may be guaranteed without the user's perception. Besides, in the special case the certificate is abnormal, a time span of security threats caused by the certificate abnormality can be shortened by forcing certificate update. On the one hand, it ensures that users have smooth user experiences without lengthening a certificate maintenance process or preventing a secure connection to the cloud. On the other hand, an environment security of the Internet of Vehicles is effectively supported. In addition, threats to vehicles can be identified in time through security audits, so as to take emergency response measures. A dynamic configuration of the certificate maintenance cycle and a mandatory certificate maintenance operation in special circumstances can be realized by combining with the remote function of the vehicle network terminal.

Disclosed above are only preferred embodiments of the present invention, and of course, they are not intended to limit the right scope of the present invention. Therefore, equivalent changes made according to the claims of the present invention are still within the scope of the present invention.

What is claimed is:

1. A vehicle digital certificate management method, comprising:
    step S1: performing an initialization on a universal digital certificate after a vehicle-mounted network connection terminal is powered on, obtaining a validity of the universal digital certificate, and generating mandatory certificate maintenance request information if the universal digital certificate is abnormal;
    step S2: obtaining a real time when the vehicle-mounted network connection terminal is powered on, the mandatory certificate maintenance request information and a preset certificate maintenance period;
    step S3: calculating a difference between the real time when the vehicle-mounted network connection terminal is powered on and a last maintenance time of the universal digital certificate, comparing the difference with the preset certificate maintenance period, and generating period maintenance request information if the difference exceeds the preset maintenance period; and
    step S4: performing a certificate maintenance according to the mandatory certificate maintenance request information or the period maintenance request information, when a communication state of the vehicle-mounted network connection terminal satisfies a certificate maintenance condition;
    wherein the step S1 specifically comprises:
    obtaining a status of the universal digital certificate after the vehicle-mounted network connection terminal is powered on, and determining whether the universal digital certificate is damaged;
    obtaining a backup universal digital certificate in a backup area to store and overwriting an invalid universal digital certificate, if the universal digital certificate is damaged;
    repeatedly obtaining the backup universal digital certificate in the backup area if an abnormality occurs during a storage process, to store until the number of abnormalities in repeated storage exceeds a preset threshold; generating the mandatory certificate maintenance request information, and recording a status of certificate storage as failure if the number of abnormalities in repeated storage exceeds the preset threshold; and
    recording the status of the certificate storage as success, if no abnormality occurs during the storage process;
    wherein the mandatory certificate maintenance request information is identified by a distributed digital identifier DID, wherein a flag bit of the mandatory certificate maintenance request information is set to be 1 while generating the mandatory certificate maintenance request information, and a flag bit of the periodic maintenance request information is set to be 1 while generating the periodic maintenance request information in the step S3;
    wherein the step S4 specifically comprises:
    obtaining the mandatory certificate maintenance request information or the periodic maintenance request information, and obtaining the flag bit of the mandatory certificate maintenance request information or the flag bit of the periodic maintenance request information;
    triggering the certificate maintenance, if the flag bit of the mandatory certificate maintenance request information is set to 1, or the flag bit of the periodic maintenance request is set to 1; and
    further determining the communication status of the vehicle-mounted network connection terminal, if the vehicle-mounted network connection terminal is connected to a Telematics Service Provider (TSP), connecting the vehicle-mounted network connection terminal to a Content Management System (CMS) to apply for preparing the universal digital certificate.

2. The vehicle digital certificate management method of claim 1, further comprising:
    recording a certificate maintenance time, and clearing the flag bit of the mandatory certificate maintenance request information or the flag bit of the periodic maintenance request information, if the certificate is successfully prepared;

firstly determining whether the number of applications exceeds the preset threshold, if the certificate is unsuccessful;

if not, connecting the vehicle-mounted network connection terminal to the CMS again to apply for preparing the universal digital certificate; and if yes, re-obtaining the mandatory certificate maintenance request information or the periodic maintenance request information, and proceeding to subsequent steps.

3. The vehicle digital certificate management method of claim 1, further comprising:

a log managing step, running with the steps S1-S4 in real time, and storing each operation in a safety invisible area of the vehicle-mounted network connection terminal.

4. The vehicle digital certificate management method of claim 3, wherein a log management is a security audit carrier of certificate maintenance, which regularly uploads logs to the cloud, and is compared with certificate maintenance logs in a cloud CMS, to determine whether there is an illegal certificate preparation process and discover security threats in time.

5. The vehicle digital certificate management method of claim 1, wherein the initialization in step S1 is for the universal digital certificate of the vehicle, and the validity is inquired through a storage path of the universal digital certificate.

6. The vehicle digital certificate management method of claim 1, wherein the real time when the vehicle-mounted network connection terminal is powered on is configured to calculate the time span in step S3, and the preset certificate maintenance period is 1 to 254 days.

7. A vehicle digital certificate management device, comprising:

a memory; and a processor;

wherein the processor is configured to execute computer instructions stored in the memory, to implement following steps of the vehicle digital certificate management method:

perform an initialization on a universal digital certificate after a vehicle-mounted network connection terminal is powered on, obtain a validity of a universal digital certificate, and generate mandatory certificate maintenance request information if the universal digital certificate is abnormal;

obtain a real time when the vehicle-mounted network connection terminal is powered on, the mandatory certificate maintenance request information and a preset certificate maintenance period;

calculate a difference between the real time when the vehicle-mounted network connection terminal is powered on and a last maintenance time of the universal digital certificate, and compare the difference with the preset certificate maintenance period, and generate period maintenance request information if the difference exceeds the preset maintenance period; and perform a certificate maintenance according to the mandatory certificate maintenance request information or the period maintenance request information, when a communication state of the vehicle-mounted network connection terminal satisfies a certificate maintenance condition;

wherein perform the initialization on the universal digital certificate after the vehicle-mounted network connection terminal the powered on, obtain the validity of the universal digital certificate, and generate mandatory certificate maintenance request information if the universal digital certificate is abnormal specifically comprises:

obtain a status of a universal digital certificate after the vehicle-mounted network connection terminal is powered on, and determine whether the universal digital certificate is damaged, obtain a backup universal digital certificate in a backup area to store and overwrite an invalid universal digital certificate, if the universal digital certificate is damaged, repeatedly obtain the backup universal digital certificate in the backup area to store until the number of abnormalities in repeated storage exceeds a preset threshold, generate the mandatory certificate maintenance request information, and record a status of certificate storage as failure, if an abnormality occurs during a storage process, and record the status of certificate storage as success, if no abnormality occurs during the storage process;

wherein the mandatory certificate maintenance request information is identified by a distributed digital identifier DID, wherein a flag bit of the mandatory certificate maintenance request information is set to be 1 while generating the mandatory certificate maintenance request information, and a flag bit of the periodic maintenance request information is set to be 1 while generating the periodic maintenance request information;

wherein perform a certificate maintenance according to the mandatory certificate maintenance request information or the period maintenance request information, when a communication state of the vehicle-mounted network connection terminal satisfies a certificate maintenance condition specifically comprises:

obtain the mandatory certificate maintenance request information or the periodic maintenance request information, and obtain the flag bit of the mandatory certificate maintenance request information or the flag bit of the periodic maintenance request information, trigger the certificate maintenance, if the flag bit of the mandatory certificate maintenance request information is set to 1, or the flag bit of the periodic maintenance request is set to 1, and further determine the communication status of the vehicle-mounted network connection terminal, if the vehicle-mounted network connection terminal is connected to a Telematics Service Provider (TSP), and connect the vehicle-mounted network connection terminal to a Content Management System (CMS) to apply for preparing the universal digital certificate.

8. The vehicle digital certificate management device of claim 7, wherein if the certificate is successfully prepared, a certificate maintenance time is recorded, and the flag bit of the mandatory certificate maintenance request information or the flag bit of the periodic maintenance request information is cleared, wherein if the certificate is unsuccessful, whether the number of applications exceeds the preset threshold is firstly determined;

if not, the vehicle-mounted network connection terminal is connected to the CMS again to apply for preparing the universal digital certificate; and if yes, the mandatory certificate maintenance request information or the periodic maintenance request information is re-obtained, and subsequent steps are proceeded.

9. The vehicle digital certificate management device of claim 7, wherein the processor is further configured to execute computer instructions stored in the memory, to implement following steps of the vehicle digital certificate management method:
   a log managing step, running with the steps S1-S4 in real time, and storing each operation in a safety invisible area of the vehicle-mounted network connection terminal.

10. The vehicle digital certificate management method of claim 9, wherein a log management is a security audit carrier of certificate maintenance, which regularly uploads logs to the cloud, and is compared with certificate maintenance logs in a cloud CMS, to determine whether there is an illegal certificate preparation process and discover security threats in time.

11. The vehicle digital certificate management device of claim 7, wherein the initialization in step S1 is for the universal digital certificate of the vehicle, and the validity is inquired through a storage path of the universal digital certificate.

12. The vehicle digital certificate management device of claim 7, wherein the real time when the vehicle-mounted network connection terminal is powered on is configured to calculate the time span in step S3, and the preset certificate maintenance period is 1 to 254 days.

* * * * *